United States Patent
Agarwal et al.

(10) Patent No.: US 12,262,207 B2
(45) Date of Patent: Mar. 25, 2025

(54) IDENTIFYING Wi-Fi DEVICES BASED ON USER BEHAVIOR

(71) Applicant: Plume Design, Inc., Palo Alto, CA (US)

(72) Inventors: Preeti Agarwal, Mountain View, CA (US); William J. McFarland, Portola Valley, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 365 days.

(21) Appl. No.: 17/731,397

(22) Filed: Apr. 28, 2022

(65) Prior Publication Data

US 2023/0146463 A1 May 11, 2023

Related U.S. Application Data

(63) Continuation-in-part of application No. 17/521,949, filed on Nov. 9, 2021.

(51) Int. Cl.
*H04W 12/121* (2021.01)
*H04L 61/5007* (2022.01)
(Continued)

(52) U.S. Cl.
CPC ....... *H04W 12/121* (2021.01); *H04L 61/5007* (2022.05); *H04W 8/005* (2013.01);
(Continued)

(58) Field of Classification Search
CPC ... H04W 12/121; H04W 8/005; H04W 12/71; H04W 24/08; H04W 12/08; H04W 12/61;
(Continued)

(56) References Cited

U.S. PATENT DOCUMENTS 10,051,494 B2 8/2018 Rengarajan et al.
10,178,578 B1 1/2019 McFarland et al.
(Continued)

OTHER PUBLICATIONS

Ashibani et al., "Classification and Feature Extraction for User Identification for Smart Home Networks Based on Apps Access History", Dec. 2019, 18th IEEE International Conference on Machine Learning And Applications, pp. 376-380 (Year: 2019).*

*Primary Examiner* — Kenneth W Chang
(74) *Attorney, Agent, or Firm* — Nicholas Martin; Greenberg Traurig, LLP

(57) ABSTRACT

Systems and methods are provided for identifying a user device. In one implementation, a method may include the steps of monitoring one or more user devices operating on a Wi-Fi network, analyzing usage parameters with respect to each of the one or more user devices, and identifying the one or more user devices based on the usage parameters. Also, according to additional implementations, the method may include analyzing, over time, the usage parameters with respect to each of the one or more user devices. Based on the usage parameters analyzed over time, the method may include the step of creating one or more behavioral models associated with one or more users, where each behavioral model may represent a usage pattern of a respective user according to how the user uses at least one of the user devices.

18 Claims, 6 Drawing Sheets

(51) Int. Cl.
*H04W 8/00* (2009.01)
*H04W 12/71* (2021.01)
*H04W 24/08* (2009.01)
*H04L 101/622* (2022.01)

(52) U.S. Cl.
CPC .......... *H04W 12/71* (2021.01); *H04W 24/08* (2013.01); *H04L 2101/622* (2022.05)

(58) Field of Classification Search
CPC ..... H04W 12/69; H04W 24/02; H04W 24/10; H04L 61/5007; H04L 2101/622; H04L 67/535; H04L 63/1425
See application file for complete search history.

(56) References Cited

U.S. PATENT DOCUMENTS

| | | | |
|---|---|---|---|
| 10,433,194 B2 | 10/2019 | McFarland et al. | |
| 10,470,082 B2 | 11/2019 | Rengarajan et al. | |
| 10,687,227 B2 | 6/2020 | Rusackas et al. | |
| 10,708,126 B2 | 7/2020 | Singla et al. | |
| 11,109,244 B2 | 8/2021 | Rengarajan et al. | |
| 11,159,965 B2 | 10/2021 | Goswami et al. | |
| 2003/0224797 A1* | 12/2003 | Kuan | H04W 12/06 455/446 |
| 2008/0244707 A1* | 10/2008 | Bowser | H04L 63/1441 726/4 |
| 2015/0142560 A1* | 5/2015 | Singh | G06Q 30/0267 705/14.58 |
| 2017/0272313 A1 | 9/2017 | Rengarajan et al. | |
| 2017/0272965 A1 | 9/2017 | Kumar et al. | |
| 2017/0273013 A1 | 9/2017 | Edara et al. | |
| 2018/0308111 A1* | 10/2018 | Bigbee | H04L 61/5014 |
| 2018/0367560 A1* | 12/2018 | Mahaffey | G06F 11/3409 |
| 2019/0098021 A1* | 3/2019 | Farmer | H04L 63/1408 |
| 2019/0334806 A1* | 10/2019 | Sugatoor | H04L 43/10 |
| 2019/0372203 A1 | 12/2019 | Su et al. | |
| 2020/0162316 A1 | 5/2020 | Rengarajan et al. | |
| 2020/0387204 A1 | 12/2020 | McFarland et al. | |
| 2021/0105639 A1 | 4/2021 | McFarland | |
| 2021/0195441 A1 | 6/2021 | Agarwal et al. | |
| 2021/0306354 A1* | 9/2021 | Raghuramu | H04L 63/1425 |

\* cited by examiner

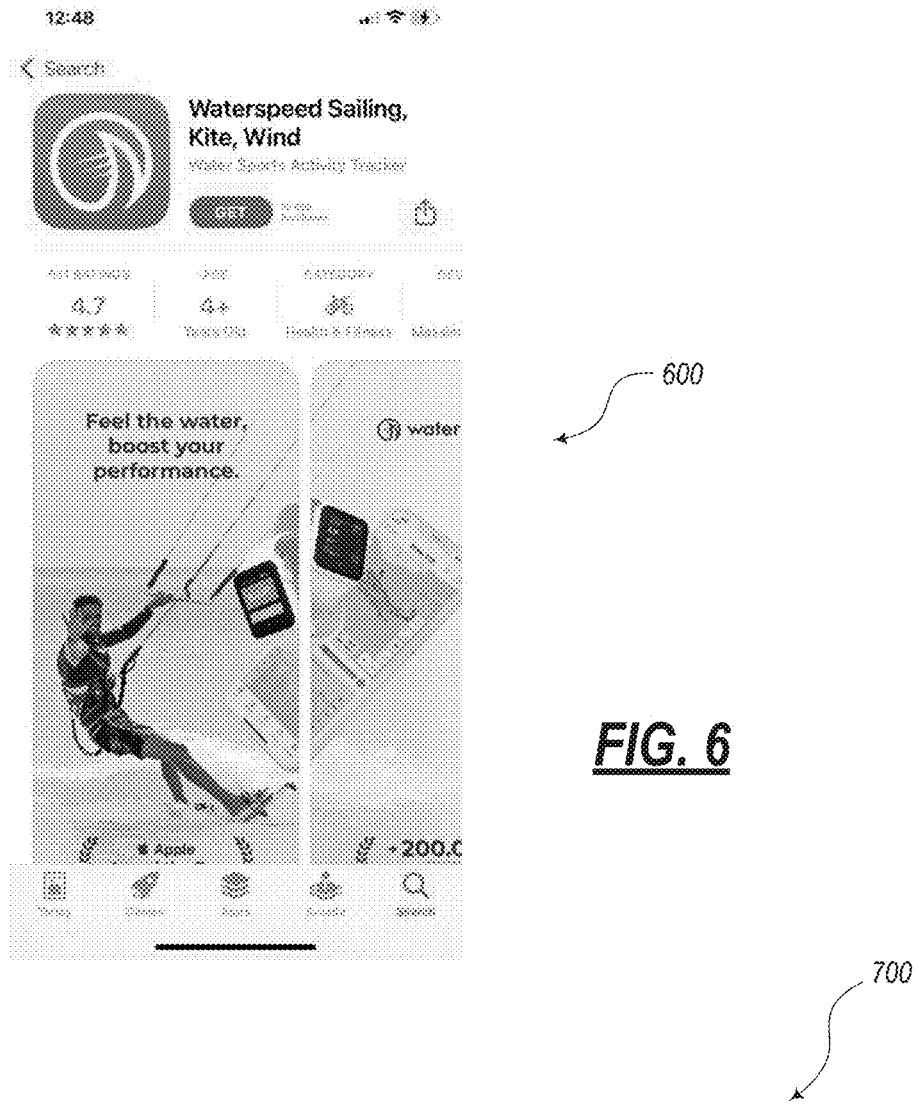

FIG. 6

| PARAMETER | WEIGHT | TYPE |
|---|---|---|
| GMAIL APP | 1 | Common – app is present on other devices |
| GAMING APP | 10 | Unique – app is present only on this device |
| ACTIVE TIME | 7 | Unique – user is active only outside of school hours and on weekends |
| GMAIL + ACTIVE TIME | 9 | Unique – user is active on gmail only for 15-20 minutes a day; user accesses websites about 6th grade subject matter; and device uses a "kitchen" access point |

FIG. 7

IDENTIFYING Wi-Fi DEVICES BASED ON USER BEHAVIOR

CROSS-REFERENCE TO RELATED APPLICATION

The present application is a Continuation-In-Part (CIP) application of and claims the benefit of priority to application Ser. No. 17/521,949, filed Nov. 9, 2021, entitled "Counteracting MAC address randomization and spoofing attempts," the contents of which are incorporated by reference herein.

FIELD OF THE DISCLOSURE

The present disclosure generally relates to networking systems and methods. More particularly, the present disclosure relates to counteracting attempts to randomize or spoof a device identifier, such as a Media Access Control (MAC) address, in a networking environment and for identifying devices in a Wi-Fi network based on user behavior, so as to stitch MAC addresses, for instance.

BACKGROUND OF THE DISCLOSURE

Wi-Fi networks are deployed to provide network connectivity to various devices (e.g., mobile devices, smart phones, computers, laptops, tablets, televisions, smart televisions, Internet of Things (IoT) devices, media players, and the like). The Media Access Control (MAC) address of a device is a unique identifier that not only uniquely identifies the device, but also identifies a device vendor, a device type, etc. That is, Wi-Fi networks utilize MAC addresses to uniquely track connecting devices.

The MAC address may be used as a network address in communications within a network segment, such as a local Wi-Fi section of a network. It can be used with Ethernet, Wi-Fi, and Bluetooth communications. Within the Open Systems Interconnection (OSI) network model, MAC addresses are used in the medium access control protocol sublayer of the data link layer. MAC addresses are typically recognizable by six groups of two hexadecimal digits.

MAC addresses may be assigned by device manufacturers as an Ethernet hardware address, such as the manufacturer's Organizationally Unique Identifier (OUI). The MAC address for a device may be stored in hardware, such as in Read-Only Memory (ROM). Addresses can either be Universally Administered Addresses (UAAs) or Locally Administered Addresses (LAA).

In some cases, network interfaces may allow these MAC addresses to be changed. For example, on most Unix-like systems, the command utility "ifconfig" may be used to remove and add link address aliases and may be used to specify which address to activate. Thus, some configurations allow the randomization of the MAC address at certain times, such as during a booting process or before establishing a network connection.

MAC address spoofing may be performed to exploit security vulnerabilities of a computer system. Some modern operating systems, such as Apple iOS and Android, especially in mobile devices, are designed to randomize the assignment of a MAC address to network interface when scanning for wireless access points to avert tracking systems. To avoid the tracking of mobile phone movement, Apple and other vendors often randomize MAC addresses in iOS (and other) devices while scanning for networks. Also, MAC address anonymization techniques may be used to allow a user to remain anonymous.

Apple platforms and similar platforms of other vendors may use a randomized MAC address when performing Wi-Fi scans not associated with a particular Wi-Fi network. These scans can be performed to find and connect to an existing Wi-Fi network. Wi-Fi MAC address randomization is supported on iPhone 5 and later models. Apple platforms also use a randomized MAC address when conducting enhanced Preferred Network Offload (ePNO) scans and are run when a device uses a location service for apps that use geofences, such as location-based reminders that determine whether the device is near a specific location. Since a device's MAC address may be changed in this case, such as when it is disconnected from the Wi-Fi network, the MAC address cannot be used to persistently to track a device, even when the device is connected to a cellular network. Also, iOS 14, iPadOS 14, and watchOS 7 introduce a new Wi-Fi privacy feature, whereby, when an iPhone, iPad, iPod touch, or Apple Watch connects to a Wi-Fi network, it identifies itself with a unique (i.e., randomized) MAC address. This feature and other privacy features can be disabled either by the user or using a new option in the Wi-Fi payload. Under certain circumstances, the device will fall back to the actual MAC address.

Some problems with MAC address randomization and anonymization techniques are that they may include one-way functions on the MAC addresses that result in the suppression of legitimate and useful functions. For example, with parent control functionality used in a Wi-Fi system, it is beneficial to provide certain controls for certain devices, which are identified more easily using the MAC address. Also, it can be beneficial to a user to include tracking systems to maintain consistency in the functioning of applications. For example, legitimate companies such as Google, Apple, and others to track user movements to preserve the identities of the people they are tracking, as well as the hardware itself. Therefore, there is a need in the field of MAC address processing to prevent the spoofing, randomization, anonymization, etc. of device identifiers to create continuity throughout the lifetime of a device.

Also, if the Operating System (OS) of Apple, Android, and other devices implement MAC address randomization, then a result may be that network-based solutions might not be able to use the MAC to uniquely identify the devices from the network traffic analysis. In addition, all OS vendors are taking increasingly stricter steps towards privacy and obscuring other indicators that can be used to track the device. For example, Wi-Fi (i.e., IEEE 802.11) may use randomized sequence numbers and/or may anonymize probe messages. It is likely that this trend may continue, which may make it more difficult for network-based solutions to track devices using protocol fields or other data that is controlled by the protocol specifications or OS vendors. There is therefore a need for a mechanism that is independent of vendor-owned software and components (e.g., networking discovery protocols).

BRIEF SUMMARY OF THE DISCLOSURE

The present disclosure relates to systems, methods, and non-transitory computer-readable media for determining when dissimilar device identifiers are used to represent the same physical device. In this case, the embodiments of the present disclosure are configured to form a link (e.g., correlation, stitch, association, etc.) between sets of information stored in a database that would otherwise be considered to be independent of each other. By analyzing certain operational parameters, network metadata, etc., the present embodiments are configured to determine when two or more different device identifiers should be linked, stitched, correlated together.

A method, according to one implementation, includes a step of obtaining a first set of operational parameters related to a first set of devices operating in a section of a network, whereby the first set of operational parameters may include at least a first set of device identifiers representing the first set of devices. The method includes a step of obtaining a second set of operational parameters related to a second set of devices operating in the section of the network, whereby the second set of operational parameters may include at least a second set of device identifiers representing the second set of devices. Also, the method includes the step of comparing the first set of device identifiers with the second set of device identifiers to find non-matching device identifiers. Then, the method includes determining if there are non-matching device identifiers of the first and second sets of device identifiers. With respect to the non-matching device identifiers, the method includes the step of analyzing the first set of operational parameters and the second set of operational parameters to determine if a device identifier of the first set of device identifiers and a device identifier of the second set of device identifiers likely represent the same device.

The method may include the step of correlating the device identifiers that are non-matching (e.g., different numbers), yet represent the same device. The correlating may include linking the information of the two device identifiers together to record that, although the device identifier had been changed at some point, the two (or more) device identifiers actually represent the same physical device. The correlating or linking may include some joining of data in a suitable database. According to some embodiments, the method may further include additional steps. For example, the method may store the first set of device identifiers in a database, store the second set of device identifiers in the database, and then correlate, in the database, the non-matching device identifiers likely representing the same device. The first and second sets of device identifiers in some cases may include Media Access Control (MAC) addresses. Also, metrics of the first set of operational parameters may be measured at a prior timeframe and metrics of the second set of operational parameters may be measured at a subsequent timeframe.

Also, the step of determining if a device identifier of the first set of device identifiers and a device identifier of the second set of device identifiers likely represent the same device may include steps of calculating a confidence score based on a relationship between the first and second sets of operational parameters, and then determining if the confidence score exceeds a predetermined threshold. The relationship, for example, may include a) matching device-operation factors, b) matching device features, c) uniqueness of matching device features, d) a weighted sum of device characteristics, e) a number of matching device characteristics, f) a Machine Learning (ML) model of device matching techniques, and/or other types matching features. The first and second sets of operational parameters may include a) a time when a device identifier is first used, b) a time when a device identifier is no longer used, c) a time when software or firmware is newly rolled out or upgraded, d) a type of a device, e) an operating system of a device, f) a language of a device, g) a destination port or address used, h) a transmission pattern, i) a length of packets, j) time information regarding packet transmissions, k) one or more applications used by a device, l) device connection information, m) device disconnection information, n) a location of a device in the section of the network, o) supplementary device identification information, p) a carrier service used by a device, and/or other suitable types of operational parameters.

In some embodiments, the first and second sets of operational parameters may be configured as networking metadata, which might include information obtained via: a) Address Resolution Protocol (ARP), b) Logical Link Control (LLC), c) Internet Control Message Protocol (ICMP), d) ICMP version 6 (ICMPv6), e) Bootstrap Protocol (BOOTP), f) Network Time Protocol (NTP), g) Transmission Control Protocol (TCP), h) Transport Layer Security (TLS), i) Dynamic Host Configuration Protocol (DHCP), j) DHCP version 6 (DHCPv6), k) Domain Name System (DNS), l) multicast DNS (mDNS), m) User Agent, n) Universal Plug and Play (UPNP), o) Shared Serial Data Protocol (SSDP), p) device capabilities information, q) port information, r) protocol information, s) 5 tuple Internet Protocol (IP) data, and/or by other network protocols.

According to some embodiments, the section of the network described above may be a local Wi-Fi network. The step of determining if a device identifier of the first set of device identifiers and a device identifier of the second set of device identifiers likely represent the same device may include setting an ending time window around a last occurrence of each of the non-matching device identifiers of the first set of device identifiers, setting a starting time window around a first occurrence of each of the non-matching device identifiers of the second set of device identifiers, and narrowing the ending time windows and starting time windows until a single device identifier of the first set of device identifiers remains and a single device identifier of the second set of device identifiers remains.

The step of determining if a device identifier of the first set of device identifiers and a device identifier of the second set of device identifiers likely represent the same device may also include storing a first set of sequence numbers used to identify packet transmission events associated with the first set of device identifiers, storing a second set of sequence numbers used to identify packet transmission events associated with the second set of device identifiers, and correlating a first device identifier of the first set of device identifiers and a second device identifier of the second set of device identifiers when a difference between an ending time of sequence numbers of the first set of sequence numbers related to the first device identifier and a starting time of sequence numbers of the second set of sequence numbers related to the second device identifier is below a predetermined threshold.

In some embodiments, the method may also include the step of operating an application on one or more devices of the first and second sets of devices to individually identify the one or more devices. For example, individually identifying the one or more devices may include: a) using a Wi-Fi Protected Access (WPA) enterprise, b) using an installed certificate, c) reading a Media Access Control (MAC) address, d) obtaining a previously-installed unique identification code, e) receiving an identifier supplied by a user through a captive portal, f) accessing user profile information, g) receiving user feedback regarding which devices to correlate, and/or other identification procedures. Furthermore, the method, according to some implementations, may include the step of creating a new (different) identifier for each device determined to be represented by non-matching device identifiers. Also, the method may include the step of creating a mapping table connecting real device identifiers, randomized device identifiers, and new identifiers.

According to some embodiments, the present disclosure further describes systems and methods for identifying user devices based on behavioral information, behavior patterns, user practices, usage information, user trends, etc. In one implementation, a process for identifying a user device may include the step of monitoring one or more user devices operating on a Wi-Fi network. The process may further include the step of analyzing usage parameters with respect to each of the one or more user devices. Also, the process may include identifying the one or more user devices based on the usage parameters.

Furthermore, in some embodiments, the process may further include the steps of a) retrieving a device identifier associated with each of the one or more user devices, and b) correlating the device identifier of each of the one or more user devices with an operational identity based on the usage parameters. For example, the device identifier associated with each of the one or more user devices may be a Media Access Control (MAC) address. The process may also include the steps of a) detecting when a new MAC address is retrieved with respect to an unidentified user device operating on the Wi-Fi network, b) analyzing current usage parameters of the unidentified user device, and c) comparing the current usage parameters of the unidentified user device with the usage parameters of the one or more previously-identified user devices. In response to determining that the current usage parameters match the usage parameters of one of the previously-identified user devices, the process may perform the step of stitching the new MAC address with the MAC address of the corresponding previously-identified user device. Alternatively, in response to determining that the current usage parameters do not match the usage parameters of the one or more previously-identified user devices, the process may perform the step of tagging the unidentified user device as a new device to be monitored on the Wi-Fi network.

The process may also include the step of analyzing, over a period of time, the usage parameters with respect to each of the one or more user devices. Then, based on the usage parameters analyzed over time, the process may include creating one or more behavioral models associated with one or more users, whereby each behavioral model may represent a usage pattern of a respective user according to how the user uses at least one of the devices. In some embodiments, the step of analyzing the usage parameters over time may include utilizing a machine learning technique to create the one or more behavioral models. The process may further include the steps of a) assigning one or more unique user identifiers for representing the one or more users, and b) associating the one or more unique user identifiers with the one or more behavioral models. Also, the process may include the step of retraining the one or more behavioral models based on changes to the usage parameters of each corresponding user.

According to additional embodiments, the usage parameters described herein may be related to an identity of one or more apps installed on the one or more user devices. Also, the usage parameters may be related to app usage information, where the app usage information may include a) a frequency of use of one or more apps, b) a time spent in each of the one or more apps, c) a type of communication associated with app use, d) a time of day of app use, and/or other information. Furthermore, the usage parameters may be related to an identity of one or more websites or domains accessed by the one or more user devices.

In some embodiments, the process may include the step of refining an identity of each of the one or more user devices based on weighted values of multiple metrics. The metrics may include a) an identity of one or more apps installed, b) app usage information, c) browsing patterns, and/or other metrics. The weighted values, for example, may be related to a uniqueness of each of the metrics. The user devices mentioned herein may include smart phones, computers, laptops, tablets, smart televisions, Internet of Things (IoT) devices, media players, or other suitable devices in communication with the Wi-Fi network. In some implementations, the usage parameters may be related to device-based behaviors, such as a) Wi-Fi access point usage, b) Wi-Fi network connection patterns, c) Bluetooth-related transmission, d) device port usage, and/or other behaviors associated with the devices.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a user device, such as a mobile device, which may be used in the distributed Wi-Fi system of FIG. 1 or the like;

FIG. 6 is a diagram showing an example of a screenshot of a user device regarding a type of mobile app;

FIG. 7 is a table showing an example of the weights of different parameters for a user device.

DETAILED DESCRIPTION OF THE DISCLOSURE

The present disclosure relates to systems and methods for analyzing device identifiers in a networking environment. Since device identifiers (e.g., Media Access Control (MAC) addresses, etc.) may be changed during the lifetime of various network devices (e.g., mobile phones), the systems and methods are configured to determine from various metadata obtained in the network whether or not a device has been represented by two (or more) different device identifiers. In order to accurately track the device, the present embodiments may be configured to form a correlation or link among all the different device identifiers that actually represent the same physical device.

The systems and methods may obtain a first set of operational parameters related to a first set of devices operating in a section of a network. This first set of operational parameters may include at least a first set of device identifiers representing the first set of devices. The systems and methods may also obtain a second set of operational parameters related to a second set of devices operating in that section of the network. This second set of operational parameters may include at least a second set of device identifiers representing the second set of devices. Also, the systems and methods may compare the first set of device identifiers with the second set of device identifiers to find non-matching device identifiers, and then determine if there are non-matching device identifiers of the first and second sets of device identifiers. With respect to the non-matching device identifiers, the systems and methods may analyze the first set of operational parameters and the second set of operational parameters to determine if a device identifier of the first set of device identifiers and a device identifier of the second set of device identifiers likely represent the same device.

Distributed Wi-Fi System

Figure 1:
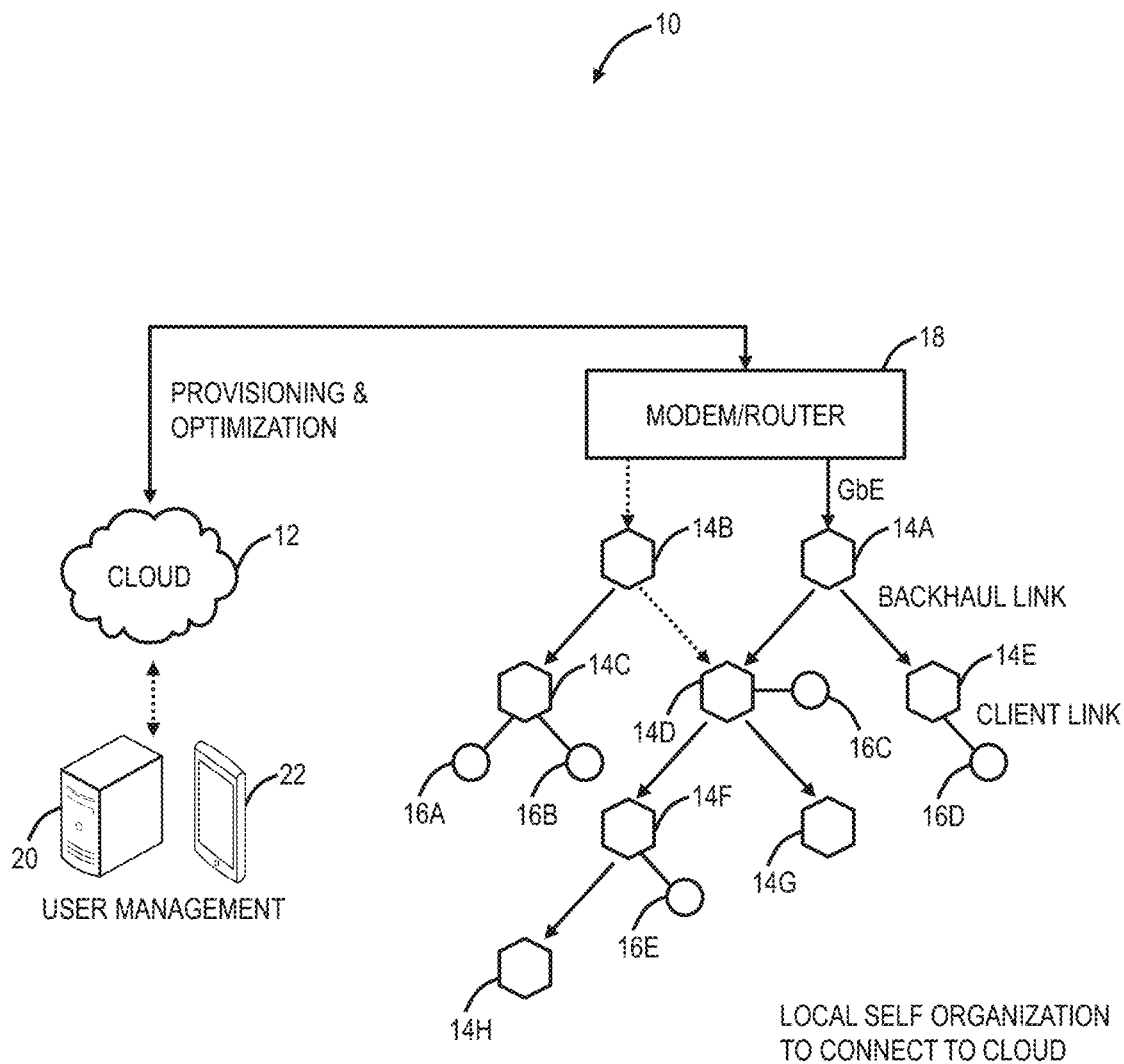
FIG. 1 is a network diagram of a distributed Wi-Fi system with cloud-based control and management.

FIG. 1 is a network diagram of a distributed Wi-Fi system 10 with control via a cloud 12 service. The distributed Wi-Fi system 10 can operate in accordance with the IEEE 802.11 protocols and variations thereof. The distributed Wi-Fi system 10 includes a plurality of access points 14 (labeled as access points 14A-14H), which can be distributed throughout a location, such as a residence, office, or the like. That is, the distributed Wi-Fi system 10 contemplates operation in any physical location where it is inefficient or impractical to service with a single access point, repeaters, or a mesh system. As described herein, the distributed Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the distributed Wi-Fi system 10 can include between 3 to 12 access points or more in a home. A large number of access points 14 (which can also be referred to as nodes in the distributed Wi-Fi system 10) ensures that the distance between any access point 14 is always small, as is the distance to any Wi-Fi client device 16 needing Wi-Fi service. That is, an objective of the distributed Wi-Fi system 10 can be for distances between the access points 14 to be of similar size as distances between the Wi-Fi client devices 16 and the associated access point 14. Such small distances ensure that every corner of a consumer's home is well covered by Wi-Fi signals. It also ensures that any given hop in the distributed Wi-Fi system 10 is short and goes through few walls. This results in very strong signal strengths for each hop in the distributed Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, IoT devices, or any network-enabled device. For external network connectivity, one or more of the access points 14 can be connected to a modem/router 18, which can be a cable modem, Digital Subscriber Loop (DSL) modem, or any device providing external network connectivity to the physical location associated with the distributed Wi-Fi system 10.

While providing excellent coverage, a large number of access points 14 (nodes) presents a coordination problem. Getting all the access points 14 configured correctly and communicating efficiently requires centralized control. This cloud 12 service can provide control via servers 20 that can be reached across the Internet and accessed remotely, such as through an application ("app") running on a user device 22. The running of the distributed Wi-Fi system 10, therefore, becomes what is commonly known as a "cloud service." The servers 20 are configured to receive measurement data, to analyze the measurement data, and to configure the access points 14 in the distributed Wi-Fi system 10 based thereon, through the cloud 12. The servers 20 can also be configured to determine which access point 14 each of the Wi-Fi client devices 16 connect (associate) with. That is, in an example aspect, the distributed Wi-Fi system 10 includes cloud-based control (with a cloud-based controller or cloud service in the cloud) to optimize, configure, and monitor the operation of the access points 14 and the Wi-Fi client devices 16. This cloud-based control is contrasted with a conventional operation that relies on a local configuration, such as by logging in locally to an access point. In the distributed Wi-Fi system 10, the control and optimization does not require local login to the access point 14, but rather the user device 22 (or a local Wi-Fi client device 16) communicating with the servers 20 in the cloud 12, such as via a disparate network (a different network than the distributed Wi-Fi system 10) (e.g., LTE, another Wi-Fi network, etc.).

The access points 14 can include both wireless links and wired links for connectivity. In the example of FIG. 1, the access point 14A has an example gigabit Ethernet (GbE) wired connection to the modem/router 18. Optionally, the access point 14B also has a wired connection to the modem/router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The distributed Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels—which can be used flexibly to serve either the client link or the backhaul link and may have at least one wired port for connectivity to the modem/router 18, or for connection to other devices. In the distributed Wi-Fi system 10, only a small subset of the access points 14 require direct connectivity to the modem/router 18 with the non-connected access points 14 communicating with the modem/router 18 through the backhaul links back to the connected access points 14.

Distributed Wi-Fi System Compared to Conventional Wi-Fi Systems

Figure 2:
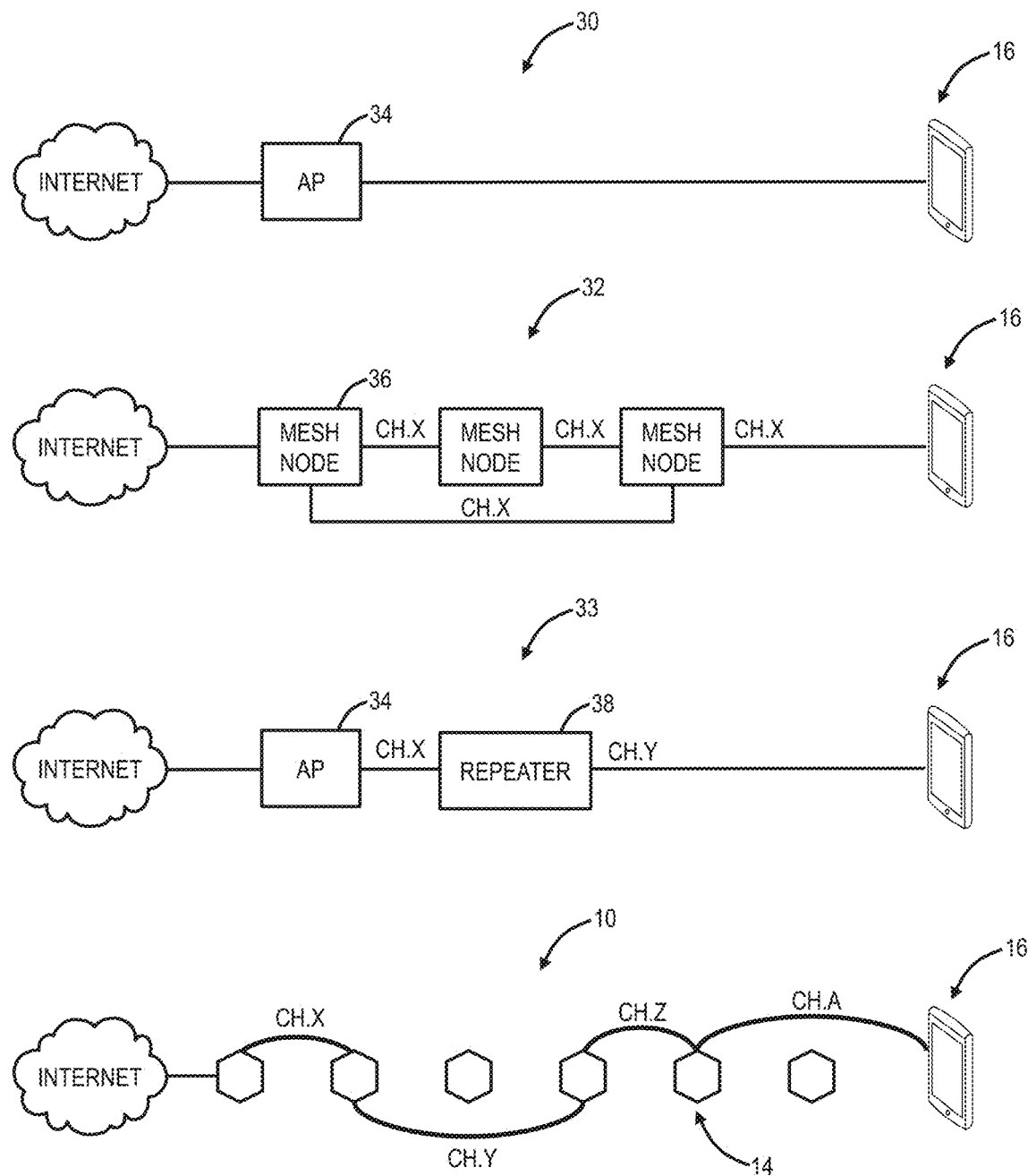
FIG. 2 is a network diagram of differences in the operation of the distributed Wi-Fi system of FIG. 1 relative to a conventional single access point system, a Wi-Fi mesh network, and a Wi-Fi repeater network.

FIG. 2 is a network diagram of differences in the operation of the distributed Wi-Fi system 10 relative to a conventional single access point system 30, a Wi-Fi mesh network 32, and a Wi-Fi repeater network 33. The single access point system 30 relies on a single, high-powered access point 34, which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36, which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only ⅓ the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The distributed Wi-Fi system 10 solves the problem with the Wi-Fi mesh network 32 of requiring the same channel for all connections by using a different channel or band for the various hops (note, some hops may use the same channel/band, but it is not required), to prevent slowing down the Wi-Fi speed. For example, the distributed Wi-Fi system 10 can use different channels/bands between access points 14 and between the Wi-Fi client device 16 (e.g., Chs. X, Y, Z, A), and also, the distributed Wi-Fi system 10 does not necessarily use every access point 14, based on configuration and optimization by the cloud 12. The distributed Wi-Fi system 10 solves the problems of the single access point system 30 by providing multiple access points 14. The distributed Wi-Fi system 10 is not constrained to a star topology as in the Wi-Fi repeater network 33, which at most allows two wireless hops between the Wi-Fi client device 16 and a gateway. Also, the distributed Wi-Fi system 10 forms a tree topology where there is one path between the Wi-Fi client device 16 and the gateway, but which allows for multiple wireless hops, unlike the Wi-Fi repeater network 33.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the distributed Wi-Fi system 10. By selecting different Wi-Fi channels between the access points 14, interference and congestion are avoided. The server 20 through the cloud 12 automatically configures the access points 14 in an optimized channel hop solution. The distributed Wi-Fi system 10 can choose routes and channels to support the ever-changing needs of consumers and their Wi-Fi client devices 16. The distributed Wi-Fi system 10 approach is to ensure Wi-Fi signals do not need to travel far—either for backhaul or client connectivity. Accordingly, the Wi-Fi signals remain strong and avoid interference by communicating on the same channel as in the Wi-Fi mesh network 32 or with Wi-Fi repeaters. In an example aspect, the servers 20 in the cloud 12 are configured to optimize channel selection for the best user experience.

Of note, the present disclosure for identifying MAC addresses is not limited to the distributed Wi-Fi system 10 but contemplates any of the Wi-Fi networks 10, 30, 32, 33, including monitoring through the cloud 12 as well as local monitoring.

Cloud-Based Wi-Fi Management

Conventional Wi-Fi systems utilize local management, such as where a user on the Wi-Fi network connects to a designated address (e.g., 192.168.1.1, etc.). The distributed Wi-Fi system 10 is configured for cloud-based management via the servers 20 in the cloud 12. Also, the single access point system 30, the Wi-Fi mesh network 32, and the Wi-Fi repeater network 33 can support cloud-based management as described above. For example, the APs 34 and/or the mesh nodes 36 can be configured to communicate with the servers 20 in the cloud 12. This configuration can be through a software agent installed in each device or the like, e.g., OpenSync. As described herein, cloud-based management includes reporting of Wi-Fi related performance metrics to the cloud 12 as well as receiving Wi-Fi-related configuration parameters from the cloud 12. The systems and methods contemplate use with any Wi-Fi system (i.e., the distributed Wi-Fi system 10, the single access point system 30, the Wi-Fi mesh network 32, and the Wi-Fi repeater network 33, etc.), including systems that only support reporting of Wi-Fi related performance metrics (and not supporting cloud-based configuration).

The cloud 12 utilizes cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase SaaS is sometimes used to describe application programs offered through cloud computing. A common shorthand for a provided cloud computing service (or even an aggregation of all existing cloud services) is "the cloud."

Example Server Architecture

Figure 3:
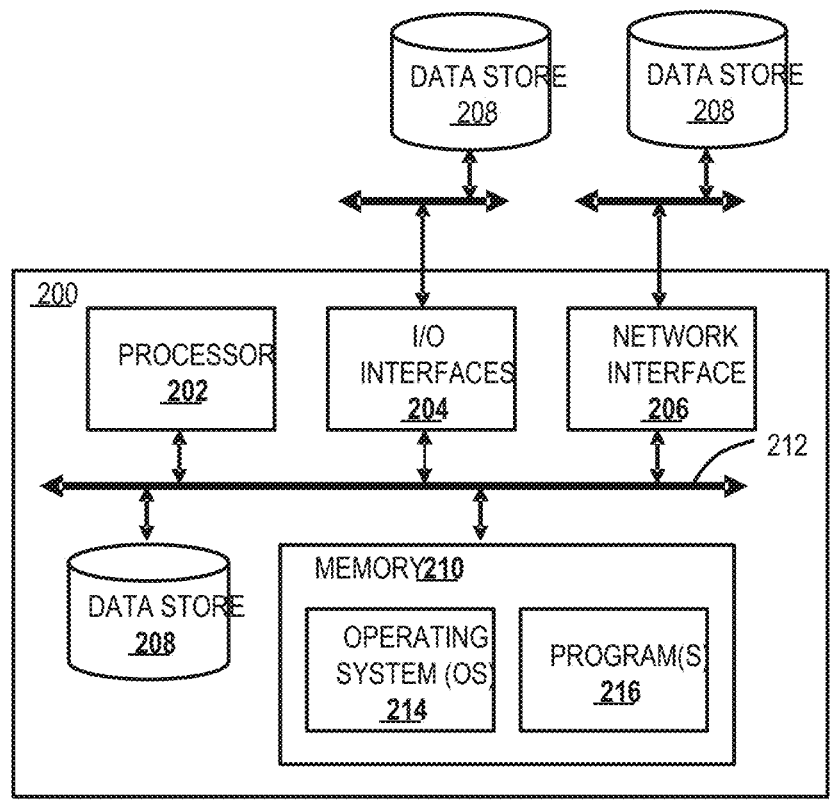
FIG. 3 is a block diagram of a server which may be used in the cloud, in other systems, or standalone.

FIG. 3 is a block diagram of a server 200 which may be used in the cloud 12, in other systems, or standalone. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. The user input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet. The network interface 206 may include, for example, an Ethernet card or adapter (e.g., 10BaseT, Fast Ethernet, Gigabit Ethernet, 10 GbE) or a wireless local area network (W LAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 4:
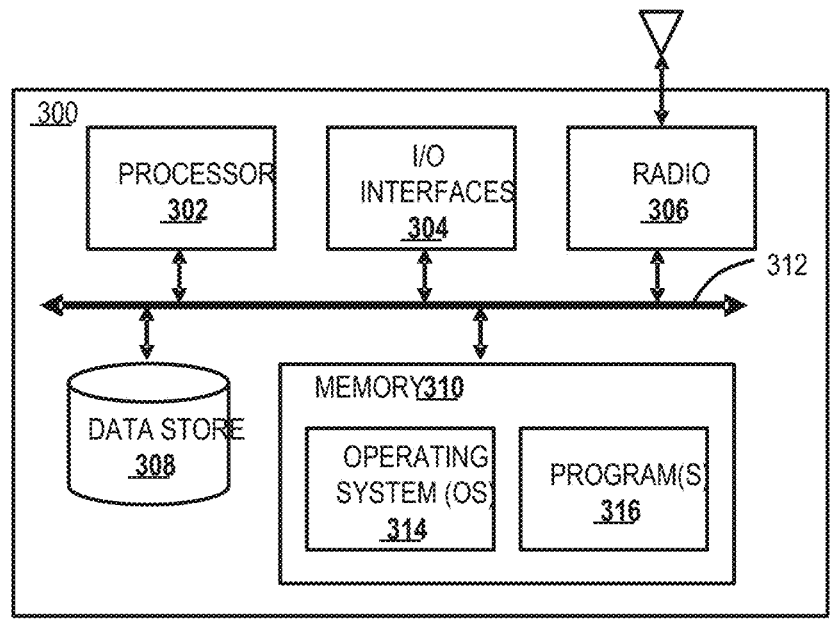

FIG. 4 is a block diagram of a user device 300, which may be used for the user device 22 or the like. The user device 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the user device 300. Additionally, the I/O interfaces 304 may further include an imaging device, i.e., camera, video camera, etc.

The radio 306 enables wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g., 3G/4G/5G, etc.); wireless home network communication protocols; proprietary wireless data communication protocols such as variants of Wireless USB; and any other protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system (O/S) 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. In a typical example, the end user typically uses one or more of the programs 316 along with a network.

Correlating Device Identifiers

The programs 216 of the server 200 and/or the programs 316 of the user device 300 may include a "device identifier correlating program" or other similar programs for correlating non-matching device identifiers to provide continuity of identification information when a device identifier (e.g., MAC address) is changed during the lifetime of the device. Thus, the functionality of correlating device identifiers may be performed on the server 200, on the user device 300 itself, or in a combination of the server 200, user device 300, and/or other systems or devices within the network in which communication devices (e.g., user devices) are operating. In some cases, the server 200 may be configured to download one or more applications or programs (e.g., the device identifier correlating program) to one or more user devices 300 to perform at least some of the steps described in the present disclosure.

The device identifier correlating program, according to various embodiments of the present disclosure, may be stored in a non-transitory computer-readable storage medium (e.g., memory 210, 310, etc.). The device identifier correlating program may have computer readable code that is configured to program the server 200, user device 300, etc. to perform certain functions, which may be aided by the processor 202, 302, or other suitable processing device.

The device identifier correlating program is configured to correlate two dissimilar device identifiers when it is determined, with at least a reasonable level of certainty, that the device identifiers actually represent the same device (e.g., user device 300). Therefore, by measuring and utilizing network metadata, the device identifier correlating program is configured to determine when it is likely that two different device identifiers (e.g., MAC addresses), obtained at two different points in time, represent a situation where the device identifier had been changed. For example, by analyzing the network metadata (e.g., device type, times when one device identifier no longer appears and another appears for the first time, etc.), the systems and methods of the present disclosure are configured to process this evidence to determine whether a first device identifier is related to a second device identifier. The process of "correlating" two (or more) different device identifiers (each representing the same device) may include storing a link in a database (e.g., data store 208, 308, etc.) that connects the two (or more) device identifiers. For example, the term "correlating" may also be referred to in the present disclosure as "stitching," "associating," "linking," "relating," "connecting," "uniting," "joining," etc. and involves forming a continuity in the records for each particular device, whether the device identifier for each respective device changes or not. The device identifier correlating program may be configured to investigate the evidence of the network metadata for making reasonable inferences regarding which device identifiers should be linked.

According to various embodiments of the present disclosure, the device identifier correlating program 216, 316 may be deployed in various forms to the server 200, one or more user devices 300, network management systems, control systems, routers, modems, etc. within a network. Each respective version of the software/firmware for detecting device identity (and other functions described throughout the present disclosure) may include any suitable functionality for operation at each part of the network as is described in the present disclosure and as would be understood by one of ordinary skill having knowledge of the present disclosure. For example, some processing functionality may be embedded in (or deployed in) one or more Access Points (APs) of a Wi-Fi network, in a router or modem, in the cloud, in an Internet device (e.g., server), offline (e.g., for operation that not in real time), online in real time, etc. Also, the systems and methods in some implementations may include a historical approach where information may be obtained for looking backwards in time to "fill in the gaps" with respect to MAC address changes.

Figure 5:
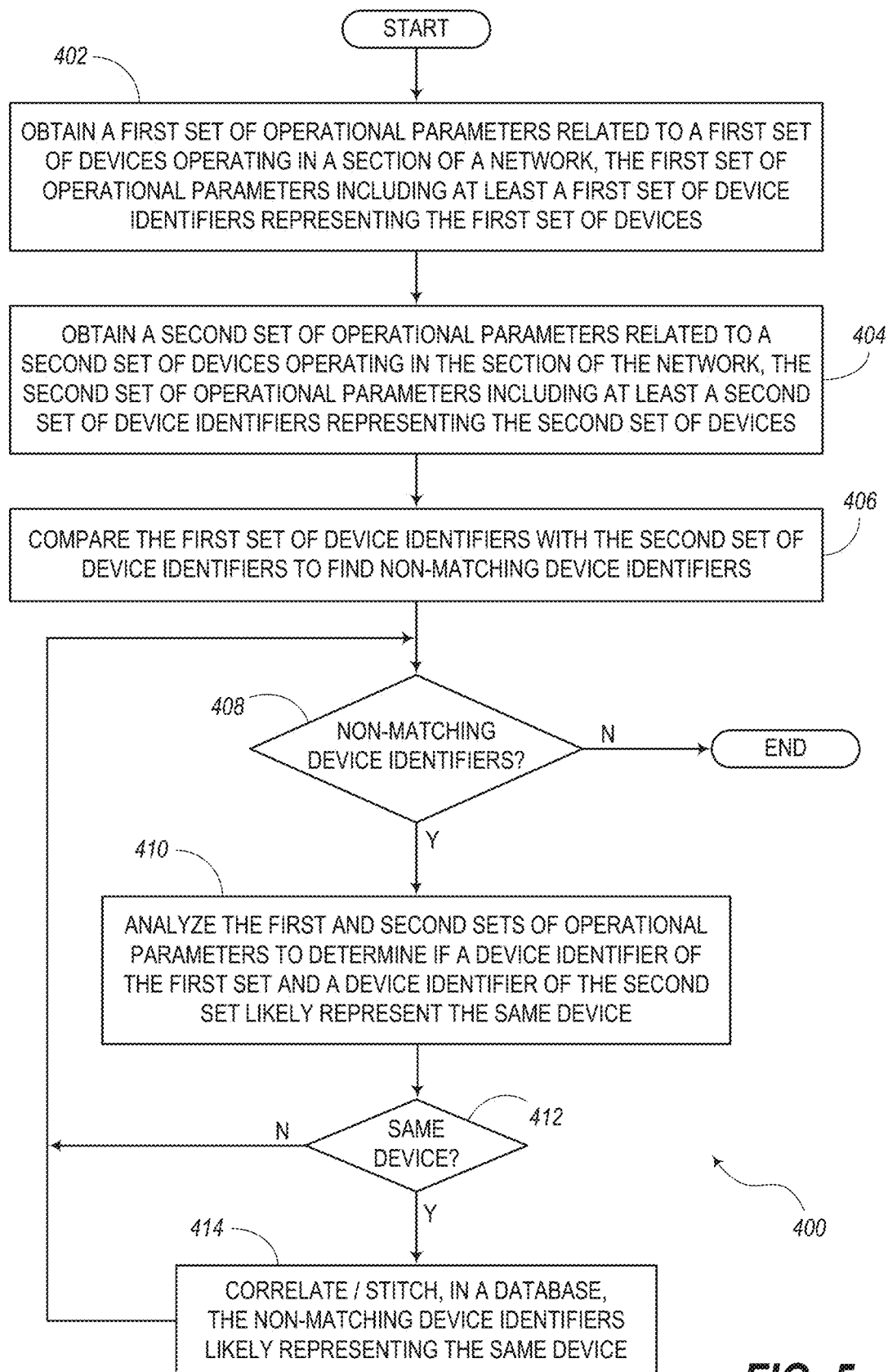
FIG. 5 is a flow diagram showing a process for correlating dissimilar device identifiers together when it is determined that the device identifiers actually represent the same device.

FIG. 5 is a flow diagram illustrating an embodiment of a process 400 for correlating, stitching, or linking dissimilar device identifiers in a database when they are related to the same physical device. The process 400 includes a first step of obtaining a first set of operational parameters related to a first set of devices operating in a section of a network, as indicated in block 402. For example, the first set of operational parameters may include at least a first set of device identifiers representing the first set of devices. The process 400 also includes the step of obtaining a second set of operational parameters related to a second set of devices operating in the section of the network, as indicated in block 404. For example, the second set of operational parameters may include at least a second set of device identifiers representing the second set of devices. Also, the process 400 includes the step of comparing the first set of device identifiers with the second set of device identifiers to find non-matching device identifiers, as indicated in block 406.

Next, the process 400 includes determining if there are non-matching device identifiers of the first and second sets of device identifiers, as indicated in condition diamond 408. If there are no non-matching device identifiers (or no more non-matching device identifiers that have not already been processed), the process 400 ends. Otherwise, if non-matching device identifiers are detected in condition diamond 408, then the process 400 proceeds to block 410. Thus, with respect to the non-matching device identifiers, the process 400 includes the step of analyzing the first set of operational parameters and the second set of operational parameters to determine if a device identifier of the first set of device identifiers and a device identifier of the second set of device identifiers likely represent the same device. If it is determined in condition diamond 412 that they are the same device, then the process 400 proceeds to block 414. Otherwise, the process 400 loops back to condition diamond 408 to determine if more non-matching device identifiers exist. As indicated in block 414, the process 400 includes the step of correlating the device identifiers that are non-matching (e.g., different numbers), yet represent the same device. The correlating may include linking the information of the two device identifiers together to record that, although the device identifier had been changed at some point, the two (or more) device identifiers actually represent the same physical device. The correlating or linking again may include some joining of data in a suitable database (e.g., data store 208, 308). After correlating, the process 400 returns back to condition diamond 408 to process more non-matching device identifiers.

According to some embodiments, the process 400 may further include additional steps. For example, the process 400 may store the first set of device identifiers in a database, store the second set of device identifiers in the database, and then correlate, in the database, the non-matching device identifiers likely representing the same device. The first and second sets of device identifiers in some cases may include Media Access Control (MAC) addresses. Also, metrics of the first set of operational parameters may be measured at a prior timeframe and metrics of the second set of operational parameters may be measured at a subsequent timeframe.

Also, the step of determining if a device identifier of the first set of device identifiers and a device identifier of the second set of device identifiers likely represent the same device (e.g., block 410) may include steps of calculating a confidence score based on a relationship between the first and second sets of operational parameters, and then determining if the confidence score exceeds a predetermined threshold. The relationship, for example, may include a) matching device-operation factors, b) matching device features, c) uniqueness of matching device features, d) a weighted sum of device characteristics, e) a number of matching device characteristics, f) a Machine Learning (ML) model of device matching techniques, and/or other types matching features. The first and second sets of operational parameters may include a) a time when a device identifier is first used, b) a time when a device identifier is no longer used, c) a time when software or firmware is newly rolled out or upgraded, d) a type of a device, e) an operating system of a device, f) a language of a device, g) a destination port or address used, h) a transmission pattern, i) a length of packets, j) time information regarding packet transmissions, k) one or more applications used by a device, l) device connection information, m) device disconnection information, n) a location of a device in the section of the network, o) supplementary device identification information, p) a carrier service used by a device, and/or other suitable types of operational parameters.

In some embodiments, the first and second sets of operational parameters may be configured as networking metadata, which might include information obtained via: a) Address Resolution Protocol (ARP), b) Logical Link Control (LLC), c) Internet Control Message Protocol (ICMP), d) ICMP version 6 (ICMPv6), e) Bootstrap Protocol (BOOTP), f) Network Time Protocol (NTP), g) Transmission Control Protocol (TCP), h) Transport Layer Security (TLS), i) Dynamic Host Configuration Protocol (DHCP), j) DHCP version 6 (DHCPv6), k) Domain Name System (DNS), l) multicast DNS (mDNS), m) User Agent, n) Universal Plug and Play (UPNP), o) Shared Serial Data Protocol (SSDP), p) device capabilities information, q) port information, r) protocol information, s) 5 tuple Internet Protocol (IP) data, and/or by other network protocols.

According to some embodiments, the section of the network described above may be a local Wi-Fi network. The step of determining if a device identifier of the first set of device identifiers and a device identifier of the second set of device identifiers likely represent the same device (e.g., block 410) may include setting an ending time window around a last occurrence of each of the non-matching device identifiers of the first set of device identifiers, setting a starting time window around a first occurrence of each of the non-matching device identifiers of the second set of device identifiers, and narrowing the ending time windows and starting time windows until a single device identifier of the first set of device identifiers remains and a single device identifier of the second set of device identifiers remains.

The step of determining if a device identifier of the first set of device identifiers and a device identifier of the second set of device identifiers likely represent the same device (e.g., block 410) may also include storing a first set of sequence numbers used to identify packet transmission events associated with the first set of device identifiers, storing a second set of sequence numbers used to identify packet transmission events associated with the second set of device identifiers, and correlating a first device identifier of the first set of device identifiers and a second device identifier of the second set of device identifiers when a difference between an ending time of sequence numbers of the first set of sequence numbers related to the first device identifier and a starting time of sequence numbers of the second set of sequence numbers related to the second device identifier is below a predetermined threshold.

In some embodiments, the process 400 may also include the step of operating an application on one or more devices of the first and second sets of devices to individually identify the one or more devices. For example, individually identifying the one or more devices may include: a) using a Wi-Fi Protected Access (WPA) enterprise, b) using an installed certificate, c) reading a Media Access Control (MAC) address, d) obtaining a previously-installed unique identification code, e) receiving an identifier supplied by a user through a captive portal, f) accessing user profile information, g) receiving user feedback regarding which devices to correlate, and/or other identification procedures.

Furthermore, the process 400, according to some implementations, may include the step of creating a new identifier for each device determined to be represented by non-matching device identifiers. Also, the process 400 may include the step of creating a mapping table connecting real device identifiers, randomized device identifiers, and new identifiers.

Identifying which MAC Addresses should be Stitched/Correlated

The systems and methods of the present disclosure may utilize temporal factors to determine if a device identifier used at an earlier point in time represents the same physical device that is represented by a different device identifier used at a later time. For example, the device identifier correlating program 216, 316 (or other systems and methods described in the present disclosure) may be configured analyze the network metadata that can be obtained from an operating network. From this metadata, the device identifier correlating program 216, 316 can keep track of the occurrences of MAC addresses (or other device identifiers) that are used. The device identifier correlating program 216, 316 can record the times that one or more new MAC addresses first appear and record the times that one or more old MAC addresses no longer appear. For example, if may be determined at a certain time t that a specific MAC address is no longer used in the network and that a new MAC address first appears shortly thereafter (e.g., t+x, where x may be a relatively short amount of time). In this case, the temporal information can be used to consider that there may be a possibility that these two MAC addresses represent the same device. Of course, further analysis can be used to confirm (with a reasonable degree of certainty) that they do indeed represent the same device (or likely represent the same device).

In some embodiments, the temporal analysis procedures may include setting time windows before and after each of the last occurrences and first occurrences of each MAC address that discontinue or begin under the observation of the device identifier correlating program 216, 316. These time windows may be initially set with a width time span (e.g., several days), whereby there may be a large overlap of several MAC addresses discontinuing and/or beginning. The device identifier correlating program 216, 316 may then narrow the time windows until there is a single match between an ending MAC address and a starting MAC address. A stitching process (e.g., correlating, joining, etc.) to connect the data of the two MAC addresses may be performed for storing this correlation in the data store 208, 308.

In some embodiments, an additional processing step may include determining whether or not a new software/firmware upgrade has been rolled out for devices in the network. If so, this information may be used to confirm that it is even more likely that the two dissimilar MAC addresses (connected by the temporal processing) represent the same device. This confirmation may be based on the realization that some companies (e.g., Apple) may randomize or otherwise change the MAC address of a device when new software/firmware is rolled out. Thus, the device identifier correlating program 216, 316 may be configured to use multiple characteristics, features, parameters, or other suitable information obtained from the network metadata in the detection of MAC address changes. In other words, the device identifier correlating program 216, 316 can use one analysis (e.g., temporal processing) or multiple analyses (e.g., temporal processing, software/firmware roll-out information, and other types of analysis and information processing) to determine a connection between dissimilar MAC addresses. Other types of analyses, processing steps, etc. of the network metadata may be used as described throughout the present disclosure.

For example, another type of analysis that can be performed by the device identifier correlating program 216, 316 is the process of considering device identifiers that may be candidates for correlation based on device type. That is, if two candidates for correlation both indicate that they are used to represent the same type of device, this information can be used as another confirmation that they represent the same device. Otherwise, if it is determined that the two candidates represent two different types of device, then it can be decided that these device identifiers do not represent the same device and any matching/linking can be erased or the consideration for matching/linking can be dropped.

Again, the device identifier correlating program 216, 316 can use the received network metadata to determine the device type. For example, the network metadata may include any one or more of: ARP, LLC, ICMP, ICMPv6, BOOTP, NTP, TCP, TLS Client Hello, DHCP, DHCPv6, mDNS, User Agent, UPNP, SSDP, DNS, ICMP, device capabilities, port, protocol, 5 tuple IP data, or the like.

Another factor that may be used to determine the likelihood that two (or more) dissimilar MAC addresses represent the same device is the device behavior. For example, if the behavior of a device represented by one MAC address is similar to or the same as the behavior of a device represent by another MAC address, the device identifier correlating program 216, 316 may be configured to use this information (to a certain degree) to confirm that the MAC addresses are related to the same device. Some examples of device behavior may include application ("app") usage, connection and disconnection patterns (e.g., within the network), time patterns (e.g., when the device is used), location patterns (e.g., where the device is used), etc. The location patterns, for instance, may refer to use within an area (e.g., city, country, etc.) or even on a smaller scale, such as used within a home or office. For example, the smaller scale detection of location may be based on which access points are utilized for device use.

In addition, the consideration and use of device behavior may also be related to the detection of the programming language that the device uses. This may be detected with respect to packet destination ports, packet destination addresses, patterns of transmissions, lengths of packets, Tx/Rx bytes moved, time between the transmission of packets, protocols, and the like. Device type and device behavior may be used together for determining whether two device identifiers are likely related to the same device and may also be used in the alternative to determine if the device identifiers likely represent different devices.

Furthermore, in the process of determining if two (or more) MAC addresses should be stitched, correlated, associated, etc., the device identifier correlating program 216, 316 may also obtain and utilize other parameters that form a unique ID for the device other than the MAC address. For example, other IDs may be associated with DHCP Unique Identifier (DUID), DHCPv6 DUID, TCP identifiers, mDNS options data, NetBios, ICMPv6 Neighbor Solicitation and Neighbor Advertisement packets, and the like.

The device identifier correlating program 216, 316 may also utilize sequence numbers, which are often used with some communication protocols. In this case, sequence numbers may be applied to packets in a sequential manner to identify the specific packets. These sequence numbers count up for each packet and can eventually roll over or be reset. It can be assumed, in some cases, that a device that is disconnected from a network may likely be reconnected shortly thereafter. If the MAC address is randomized in this situation, it may be seen that the sequence numbers might be roughly the same value, while other devices operating in the network may communicate packets having sequence numbers that are at a very different point in the sequence number counting/rollover process. Thus, the device identifier correlating program 216, 316 may analyze these sequence numbers to determine if two identifier represent the same device.

For determining which MAC addresses to stitch/link, the device identifier correlating program 216, 316 may be configured to consider the operating system (O/S) that is being used by the device(s), the device type, and/or firmware versions that the device(s) have. Again, the likelihood of two identifiers representing the same device may be based on these factors being the same or being similar, whereas, if these factors are different, this observation can be used to suggest that the identifiers represent different devices.

Also, metadata representing where a device identifier (e.g., MAC address) was administered can also be used to determine if two (or more) device identifiers represent the same device. For example, some devices may be configured to receive a MAC address that is locally administered (e.g., within the Wi-Fi network itself), while other devices may be configured to receive a MAC address that is administered in a traditional manner, which may include the administering of an Organizationally Unique Identifier (OUI). Furthermore, metadata regarding carrier information (e.g., which cellular service a device is using) may be used for determining the likelihood of different MAC addresses representing the same device or different devices.

Active Vs. Passive Observations for Gathering Information for Stitching

The network metadata may be obtained using passive and/or active processes. In a passive system, a monitoring device may be configured to simply observe messages from devices, where the device identifier correlating program 216, 316 may use these messages to build rules and/or train a Machine Learning (ML) model on the basis of passively observed traffic patterns.

An active system, on the other hand, may be configured to use a monitoring device to send messages to devices requesting information that can help in identifying device. In this case, the monitoring device may elicit responses that have information helpful to the device identifier correlating program 216, 316 for identifying devices. Regarding active systems, the monitoring device may obtain fields that devices will provide freely but may be withheld for privacy reasons. Eliciting responses may include requesting ICMP timestamp information and receiving a reply in the form of an ICMP Message types 13 and 15, for example. Other requests may include DHCPv6 queries, mDNS scans, SSDP scans, TCP scans, UDP-based scans, and the like, for identifying the device types and device identifiers.

Obtain User Feedback and/or Install New Device Identifier on the Device

According to some implementations, the systems and methods of the present disclosure may further include other proactive ways to obtain information that can be used for determining if dissimilar MAC addresses represent the same device. For example, instead of simply observing metadata that can be readily obtained from a network, some implementations may include allowing the device identifier correlating program 216, 316 to request useful information from the users themselves, where this information be used in a productive manner to stitch MAC addresses. Also, as mentioned above, certain functionality can be installed on a new device to track MAC address changes more easily.

According to some examples, the systems and methods of the present disclosure may use a Wi-Fi Protected Access (WPA) Enterprise, install a certificate, install an app on a device (e.g., newly issued to a user) that proffers a unique ID, install an app on the device that reads the real MAC address or other identifiers already on device, and the like. This information can then be reported to the device identifier correlating program 216, 316 as needed for stitching/linking. In some cases, software may be installed on a new device such that a user of the new device may be required to go through a captive portal, such that user supplies identifier (e.g., login name or the like) for the device. This information can be stored and reported for device identity purposes.

The user may be requested to enter a user profile that includes information about the user himself/herself and information about the device itself. This may be included in an app (e.g., an Internet access app for providing parental control, limiting usage during different times of the day, limiting access to certain sites, etc.). With the app installed on the device, the user be required to re-enter certain information, such as when new firmware is updated or other times when the device may be subjected to MAC address randomization. In this case, the user data can be used by the device identifier correlating program 216, 316 to determine that different MAC addresses are actually referring to the same device.

According to some embodiments, the app may be configured to make suggestions as to what device identifiers to stitch/link together and ask the user for a response. Then, the user can approve the suggestions, disapprove the suggestions, or decline to respond. Also, the app may be configured to provide options among eligible device identifiers and ask the user to select which ones correspond to the same device. In some embodiments, the app may be configured to inform the user that it has automatically correlated, stitched, associated two or more device identifiers together and in response, the user can accept or deny this stitching, if he or she wishes, and/or request that the stitching be reversed. The app may also be configured to provide opportunities for the user to manually correct any stitching/correlating processes.

According to various implementations, the application ("app") installed on a user device may include various settings and/or be associated with other functionality. For example, the embodiments of the present disclosure may be added on to other software/firmware products for enabling the device identifying processes along with any other combination of software functions for performing other services.

For example, the app may be configured to transfer configurations that the user or system has applied to the device in question. The configurations may include setting for parental controls, settings for cyber security (e.g., blacklisting sites, whitelisting sites, or the like), device nicknames, user ID, user profile, access control zones, motion detection settings, sensor alerts (e.g., health-related or biological-related settings), content filters (e.g., for teenagers and children), policy settings, Internet Freeze settings and schedules, Quality of Service (QoS) prioritization settings (e.g., set by devices, services, applications, etc.), room assignment information, previously obtained captive portal login information, device access restrictions, quarantine or blocking status of a given device, group assignment, sharing of access, screen time settings and state, app usage state, and/or other suitable settings limitations, restrictions, parameters, etc. In the case where there may be multiple stitching options, the app may be configured to transfer any settings, restrictions, etc. that include the same options.

Create Data Continuity Regarding the Device

Once the device identifier correlating program 216, 316 has determined (with reasonable certainty) that two (or more) device identifiers represent the same physical device, then certain procedures may be performed to create a continuity of data with respect to the two (or more) device identifiers. In other words, the device identifier correlating program 216, 316 may create any suitable link or stitching in the data store 208, 308 for uniting the records related to the same device.

In one embodiment, the device identifier correlating program 216, 316 may be configured to rewrite the database with the newly found/determined local MAC addresses. Also, at query time, the device identifier correlating program 216, 316 may be configured to join multiple MAC address records based on an association table that lists aliases.

According to some embodiments, the systems and methods of the present disclosure may be configured to create a new identifier (or new device identifier) which is unique per device and is kept for the lifetime of the device. This may be considered as a preferred way of stitching, linking, associating, joining, etc. In this case, the device identifier correlating program 216, 316 may be configured to rewrite the entries with the database (or databases) with the new unique identifier. The systems and methods may also store a mapping table that connects the real MAC address and any detected randomized MAC addresses to the new identifier. The mapping table may be organized as a slowly changing dimension table. The function of mapping may be performed on the fly and may include the action of storing new data with the unique identifier as it is obtained and analyzed. Also, the data may be stored with the current in-use MAC address and convert this to the unique identifier during the reading of data on the basis of the mapping table.

Confidence Score in Association with Correlating/Stitching

Another aspect of the various systems and methods of the present disclosure is the confidence in which the device identifier correlating program 216, 316 can reasonably infer from the metadata that two (or more) different MAC addresses are actually referring to a single physical device. The confidence (or level of certainty) of this detected connection may be characterized by a specific score or value, which may be referred to herein as a "confidence score." The confidence score may be based (at least partially) on how many factors match. The confidence score may be based (at least partially) on the uniqueness of the factors that match. The confidence score may be based (at least partially) on a weighted sum of the various factors that match and how unique each of those factors are. Also, the confidence score may be influenced by how many potential candidates (e.g., non-matching device identifier candidates) exist (e.g., which are to be analyzed for potential stitching/correlating).

Calculating the confidence score may include fine-grained weighing. For instance, this may include weighing each of the factors on the basis of the device type, firmware version, temporal factors, application usage, device language, location information, etc. For example, any iOS device could be uniquely identified on the basis of various factors (e.g., DHCP, DHCPv6, ICMP, ICMPv6, QUIC, HTTP UA, etc.). However, in the case of iOS14, for example, a higher weight may be given to DHCPv6 compared to other fields (e.g., mDNS, ICMPv6, etc.) given higher weights in iOS15. Therefore, rules may be built and modified as needed to accommodate different type of devices and operating systems. Also, as new devices and operating systems are deployed in a network, the systems and methods of the present disclosure may be updated to specifically characterize the weights of various factors of these new devices. Therefore, in some implementations, the device identifier correlating program 216, 316 may utilize artificial intelligence, such as Machine Learning (ML) to periodically train and modify new ML models for each version and model of various devices. ML-based models may be used for specific operation with each version and model of the devices.

In some embodiments, the device identifier correlating program 216, 316 may be configured to take a multi-layer approach for device identification. For example, rather than applying flat weighted averages, the device identifier correlating program 216, 316 may be configured to apply a hierarchical ML clustering approach in the procedure for determining that two (or more) MAC addresses should be stitched together. This can be done to initially classify the devices on the basis of their types, models, operating systems, and the like. Then, in the next step, the device identifier correlating program 216, 316 may be configured to uniquely identify each device within the clusters and ML-models obtained in the stitching step.

Also, the present disclosure may also include embodiments that utilize a process of auto-tuning the time interval for collecting data from network. For example, this may include a data collection interval that is adjusted on the basis of the feedback from an identification engine. As soon the necessary confidence in device identification is achieved, the data collection may be stopped or paused for that specific device. In some cases, the stitching/correlating may be performed only when the confidence score is above a certain threshold (e.g., above about 90%). The systems and methods may use the confidence scores to delay stitching/correlating such that more information can be gathered, or such that the re-appearance of some of the potential stitching candidates can be periodically observed in the network. Also, the confidence score may be used to determine when it may be necessary to ask the user for feedback to more accurately determine if MAC addresses should be linked/stitched.

Hostname Masking

According to some embodiments, the app for stitching MAC addresses may allow a user to input a nickname for a device on the network. This nickname may effectively replace any unique hostnames in the user interface. The device identifier correlating program 216, 316 may be configured to populate or associate the hostname to the device (e.g., following MAC randomization) based on the MAC correlating/stitching that is performed. In some embodiments, the app may make up a random hostname for the given device (e.g., iPhone Blue) so that the different devices are distinguishable in the app. The user may come to know which is their device by observation over time. The app may prompt the user to enter a nickname when a device with a hostname masked is connected to the network. The device type information at that time can be used to aid in the identification of which device is being asked for a nickname. Also, the systems and methods may use any available device type information as the hostname (e.g., Apple iPhone 7 Max).

MAC Stitching Based on User Behavior

The programs 216 of the server 200 and/or the programs 316 of the user device 300 may include a "user device identifying program" or other similar programs for identifying a user device connected to a Wi-Fi network based on usage parameters. Thus, the functionality of identifying user devices on the Wi-Fi network may be performed on the server 200, on the user device 300 itself, or in a combination of the server 200, user device 300, and/or other systems or devices within the network in which communication devices (e.g., user devices) are operating. In some cases, the server 200 may be configured to download one or more applications or programs (e.g., the user device identifying program) to one or more user devices 300 to perform at least some of the steps described in the present disclosure.

The user device identifying program, according to various embodiments of the present disclosure, may be stored in a non-transitory computer-readable storage medium (e.g., memory 210, 310, etc.). The user device identifying program may have computer readable code that is configured to program the server 200, user device 300, etc. to perform certain functions, which may be aided by the processor 202, 302, or other suitable processing device.

In some embodiments, the user device identifying program may be configured to correlate two dissimilar device identifiers when it is determined, with at least a reasonable level of certainty, that the device identifiers actually represent the same device (e.g., user device 300). Therefore, by analyzing usage parameters associated with the use of the user devices on the Wi-Fi network, the user device identifying program may be configured to determine when it is likely that two different device identifiers (e.g., MAC addresses), obtained at two different points in time, represent a situation where the device identifier had been changed. For example, by analyzing the usage parameter (e.g., types or categories of app installed on the user device, app usage, ports open on the user device, user's browsing patterns, Bluetooth communication information, Wi-Fi access points used, etc.), the systems and methods of the present disclosure are configured to process these usage parameters to determine the identity of the user devices and whether a first user device identifier may be related to a second user device identifier.

According to various embodiments of the present disclosure, the user device identifying program (e.g., programs 216, 316) may be deployed in various forms to the server 200, one or more user devices 300, network management systems, control systems, routers, modems, etc. within a network. Each respective version of the software/firmware for detecting user device identity (and other functions described throughout the present disclosure) may include any suitable functionality for operation at each part of the network as is described in the present disclosure and as would be understood by one of ordinary skill having knowledge of the present disclosure. For example, some processing functionality may be embedded in (or deployed in) one or more Access Points (APs) of a Wi-Fi network, in a router or modem, in the cloud, in an Internet device (e.g., server), offline (e.g., for operation that not in real time), online in real time, etc.

According to some embodiments, the systems and methods of the present disclosure may be configured to perform a process for stitching MAC addresses (or other user device identifier) based on user behavior of one or more user devices. In one generalized embodiment, the systems and methods of the present disclosure may include the step of monitoring one or more user devices operating on a Wi-Fi network. The systems and methods may also include the step of analyzing usage parameters with respect to each of the one or more user devices. Also, the systems and methods may then identify the one or more user devices based on these usage parameters.

In some embodiments, the systems and methods may include retrieving a device identifier associated with each of the one or more user devices and then correlating the device identifier of each of the one or more user devices with an operational identity based on the usage parameters. For example, the device identifier associated with each of the one or more user devices may be a Media Access Control (MAC) address. The systems and methods may also include the steps of a) detecting when a new MAC address is retrieved with respect to an unidentified user device operating on the Wi-Fi network, b) analyzing current usage parameters of the unidentified user device, and c) comparing the current usage parameters of the unidentified user device with the usage parameters of the one or more previously-identified user devices. In response to determining that the current usage parameters match the usage parameters of one of the previously-identified user devices, the process may also include the step of stitching the new MAC address with the MAC address of the corresponding previously-identified user device. In response to determining that the current usage parameters do not match the usage parameters of the one or more previously-identified user devices, the process may include the step of tagging the unidentified user device as a new device to be monitored on the Wi-Fi network.

Furthermore, the systems and methods of the present disclosure may also include performing the steps of a) analyzing, over time, the usage parameters with respect to each of the one or more user devices, and b) based on the usage parameters analyzed over time, creating one or more behavioral models associated with one or more users. Each behavioral model may represent a usage pattern of a respective user according to how the user uses a user devices. Alternatively, in the case where the user uses more than one device, the behavioral model may be associated with multiple devices to represent that the one user uses common usage behaviors on each of his or her devices. The step of analyzing the usage parameters over time may include utilizing a machine learning technique to create the one or more behavioral models. The systems and methods, according to some embodiments, may further include performing the steps of a) assigning one or more unique user identifiers for representing the one or more users, and b) associating the one or more unique user identifiers with the one or more behavioral models. The systems and methods may also perform the step of retraining the one or more behavioral models based on changes to the usage parameters of each corresponding user.

For example, the "usage parameters," as described in the present disclosure, may include any type or category of user-based behavior patterns and/or device-based behavior patterns. The usage parameters may be related to an identity of one or more applications ("apps") installed on the one or more user devices. The usage parameters may also be related to app usage information. For instance, the app usage information may include one or more of a) a frequency of use of each of apps, b) a time that a user spends in each of the apps, c) a type of communication associated with app use, and d) a time of day when the user uses the apps. Also, the usage parameters may also be related to an identity of one or more websites or domains accessed by the one or more user devices.

According to some embodiments, the systems and methods of the present disclosure may perform the step of refining an identity of each of the one or more user devices based on weighted values of multiple metrics, such as the metrics described above. For example, the metrics having weighted values may be associated with a) an identity of one or more apps installed, b) app usage information, and/or c) browsing patterns. The weighted values may be related to a uniqueness factor of each of the metrics. The user devices, as described in the present disclosure, may include smart phones, computers, laptops, tablets, smart televisions, Internet of Things (IoT) devices, and/or media players. The usage parameters may be device-based behaviors, where the device-based behaviors may include a) Wi-Fi access point usage, b) Wi-Fi network connection patterns, c) Bluetooth-related transmission, d) device port usage, and/or other behaviors.

Identifying the user devices may be based on the MAC addresses thereof as well as user behavior and other key unique indicators. The systems and methods of the present disclosure may be configured to leverage the device's user behavior and utilize this to uniquely identify the device. It may be noted that a user's behavior is an aspect that is independent of and cannot be controlled or changed by the device vendors. As such, the present disclosure is configured to leverage the behavior patterns to identify the user devices. Also, it may be noted that one user may use more than one device and/or that a single device may be used by one or more users. The embodiments of the present disclosure are configured to create a model of this user behavior and associate the behavior to one or more devices for identification purposes. As mentioned above, each user device may have a MAC address that can be stitched to the MAC address of another user device based on the knowledge that a MAC address may be changed or randomized and/or user behavior may be associated with one or more devices.

According to some embodiments, the user's behavior may fall into the following behavioral buckets (or categories). These parameters may be key indicators of each of the user's areas of interest (or work) and may be unique to each user. It may also be noted that by analyzing user behavior over time, the user behavior of each user may be more finely tuned to create a better understanding of the user's habits or patterns. These may be distinguished from other users having different interests, patterns, behaviors, practices, etc. Also, it may be possible to identify when one or more visitors use a Wi-Fi network. These visitors may be those who are not normally members of a family or work group. The present disclosure may save a record of the usage behaviors of these visitors as well.

The buckets (or categories) of user behavior may include:
1) Application (app) installation information—This information may include the apps that are installed on a user device. For example, this information may include categories of apps (e.g., shopping apps, gaming apps, news apps, podcast apps, activity/hobby apps, business-related apps such as LinkedIn, health or medical apps, etc.). Also, this information may include a list of specific apps installed. Additional information may include whether these apps were pre-installed on the user device or if they were downloaded and installed after market.
2) App usage/activity information—This information may include a categorization based on a) usage frequency, b) time spent on each app, c) the type of communication that the apps use, d) time of day that the apps were used, etc. This will categorize the device based on the app-usage patterns of the users.
3) Browsing patterns—This category may include a) a list of the actual websites and/or domains accessed, b) the type or category of websites and/or domains accessed, etc. Examples of types or categories of websites may include financial/stock related, school/academic related, entertainment related, etc. This will categorize the device based on the user's areas of interest or concern.
4) Wi-Fi access point used—This information indicates the Wi-Fi access point to which a user device connects and the patterns with respect to connections and disconnections. For example, the systems and methods of the present disclosure may be configured to detect that, most of the time, the user device uses a certain access point in a home, indicating where a user may normally be within the home that is covered by this access point. This will categorize the device based on its physical location and movement within the home.
5) Ports open on the device—This information indicates the ports that are opened and used accordingly with respect to communicating along certain routes to access assorted services (e.g., websites).
6) Bluetooth based—This information indicates communication and transmission patterns related Bluetooth categorization. This may include clock skew information, Bluetooth Low Energy (BLE) status, piconets, traffic patterns, Universally Unique Identifier (UUID) information, local name, etc.

It may be noted that items 1-3 are related to specific (and/or intentional) "user-based" behaviors. Items 4-6 are related to specific "device-based" behaviors related to relevant protocols and settings associated with the devices.

Regarding "1) App installation information," the present disclosure may identify "categories" of applications (apps) installed. An advantage of this is that this technique may be less brittle than looking at an exact detailed app list. Also, knowing just an app category may be enough in many embodiments to sufficiently identify a device. In one example, a student might switch from one specific homework app to another, but the present disclosure may still be able to identify the phone as a student's device. The embodiments described herein may be configured to identify users and devices by a unique collection of app categories present (installed) on the device, rather than a specific list of apps themselves. For example, different app categories may include financial, school, shopping, games, entertainment, fitness, security, privacy, VPN, social networking, medical, productivity, corporate (confluence), work related, lifestyle, mobile apps, news apps, etc.

In some embodiments, the present disclosure may be configured to create a location category map. For example, this may be a category-based device map that may be useful for the home and may use machine learning. This category map may be supported by a cloud-based global intelligence using analytics at a backend cloud server. Installed apps may be defined based on their uniqueness. The benefit of this approach is that if an app is replaced with another app in the same category, the systems and methods of the present disclosure may be configured to continue to fingerprint the device. It may be noted that app-based stitching may be fragile in many cases. For example, if a home has only one device in a category and a MAC address is randomized, the new MAC will likely be the only device with that app category.

In some embodiments, the present disclosure may include a category building system using analytics. For example, a cloud-based server can maintain a list of categories and the apps that belong to those categories. Those categories can be updated and enhanced continuously based on backend research, analytics, algorithms, etc. running on the backend cloud server. The systems of the present disclosure may use telemetry data collected from the current customer households related to the installed apps. Categorization techniques may look for the app purpose and the app categories as specified by the app stores. The present systems may build in-house intelligence or partner with external vendors to assign categories to individual mobile apps.

In some cases, processing app category characteristics may be configured such that each app category may be made more specific and tagged with a geo location, a household size, a number of devices, types of devices, types of product licenses, and other demographics that can be inferred from router visibility. Data analytics and algorithm modules may be configured to run in the backend cloud system. In some cases, processing app category characteristics may be configured such that app categorization may also take into account an app security rating. This may involve working with a third party app security scoring database of in-house intelligence.

Each app may have weights associated with it and may be based on how unique it is to a device. These weights can be specific to a location/household and/or a global trend learned from backend analytics processes. Another characteristic could be whether the app is a standard pre-installed app on a certain device. This is similar to using the device type as a stitching parameter but may be based on pre-installed default apps.

FIG. 6 is a diagram showing an example of a screenshot 600 of a user device regarding a type of mobile app. In this example, app on a user device may be categorized under a specific category such as "Health & Fitness," as shown in the "category" section of the screenshot 600.

Regarding "2) App usage/activity information," usage of each app on a user device may be monitored. Usage information may include a) usage frequency, b) time spent on the app, c) type of communication, d) time of day, etc. This information may be used to categorize the user device based on the app-usage patterns of a user. Also, this may be different from general traffic analysis information, whereby the traffic analysis may be in context of a specific application.

Each app may have weights associated with it based on how unique it is to the device itself or other devices in a set (e.g., devices operating on a Wi-Fi network, devices throughout a region, state, or country, etc.). The systems and methods of the present disclosure may be configured to utilize global intelligence for this weighing. This information may be based on the data collected on the backend about the apps and device type correlation. For example, one particular app may be found only on one device within a home or across multiple homes in an area. The uniqueness of these apps may be related to school apps (e.g., google classroom, schoology, etc.).

Regarding "3) Browsing patterns," categorizations based on browsing patterns are analyzed. This may include a sequence of domains/websites accessed, a type of content category accessed, a number of times a website is revisited, ratings of the websites accessed (e.g., gray, blacklisted, etc.), and the like. The embodiments described herein may use any of a number of existing website categorization tools (e.g., WebPulse, Brightcloud, Akamai, etc.). The following is an example of some thematic categories a) real estate, b) financial, c) shopping, d) travel, e) adult, f) dating, g) religion, h) legal, i) health, j) motor vehicles, etc. It may be noted that a portion of the browsing patterns information may be device-based rather than user-based. For example, the device-based aspect of browsing patterns may include one or more protocols that may be used by the device. For example, a fitness tracking app may heavily rely on BLE technology.

Regarding "4) Wi-Fi access point used," the present disclosure may include analysis to detect patterns of access point scanning, radio signal data (e.g., radio transmission patterns), firmware clock skew based fingerprinting, sequence numbers associated with Wi-Fi packets, etc. In some cases, there may be no standard around active probing request/response processes. The timing between probe requests may remain constant for a driver. A detected timing pattern can be used to fingerprint a device. Also, unique characteristics from transient signals at the beginning of a packet transmission may be detected by the systems and methods described herein. These characteristics may be unique to a specific vendor, device, model, etc. Furthermore, the systems and methods may measure a drift in the Tx and Rx clocks using machine learning techniques to fingerprint a device. Also, the systems may leverage TCP timestamps. In some embodiments, the systems and methods may analyze clock skews that are unique to a stack.

The sequence number, in this implementation, may look like a giant counter that may rollover occasionally. Over time, different devices may be in different regions of an overall sequence number space. Even if a device is out of reach (e.g., user leaves home) and sends Wi-Fi traffic, it might be that across the time span, the device may remain in a range of the sequence number space that would be distinguishable from other devices in the home. The sequence number concept could apply to other communication methods including Bluetooth, Ethernet, or perhaps IP packets which also have a sequence number, but that sequence number is specific to a conversation, but perhaps the sequence number comes from a single counter, or restarts where it left off, etc. It may be noted that the sequence numbers might get reset after a reboot, which may happen with an update in the firmware that may cause the MAC address change. However, for something like daily MAC randomization, the system typically would not do a reboot to cause this to happen.

Regarding "5) Ports open on the device," the systems and methods of the present disclosure may observe the open ports and the services running on the device. The systems may determine vulnerabilities found on the device, security levels and security policies on that device, breaches detected on the device, etc. For example, some services may include FTP, SSH, HTTP, etc. Ports may include, for example, 8890, 20, 21, etc.

Regarding "6) Bluetooth based," the systems and methods may analyze Bluetooth pattern-based categorization. This may include firmware clock skew based fingerprinting, BLE advertisement, a device piconet, traffic patterns, etc. Each set of devices (e.g., client) may have a unique clock skew which remains constant. However, when device leaves the premises of the Wi-Fi system and then returns back, the device may end up in a different slot or skew.

The Bluetooth processing may include periodic packets from a device, fields such as a complete local name, UUID, and others that can uniquely identify the device. An advertisement interval may be unique to a device and can be used for identification, although this might change when a device leaves the premises and returns. Also, Bluetooth connections may be based on information that a device creates when it starts up or when the MAC address changes. Also, this category may include connection/disconnection information, conversation patterns, time-based patterns, size-based patterns, etc.

In some embodiments, the systems and methods of the present disclosure (e.g., using the user device identifying program 216, 316) may be configured to calculate behavior patterns based on weighted values associated with each of the above parameters. The weighted value may be based on a level of uniqueness with respect to other devices. For example, a weight may be higher if the parameter value is unique for a device (e.g., either within the home or across a larger population) and may be lower if two or more devices have the same value. In one example, it may be determined that a small percentage of the population (e.g., only one person in a household) may install a particular app on a user device, use the particular app on a regular basis, use the app during certain times of the day, and use the app while access a Wi-Fi network via a specific access point within the home. A composite parameter may be used to learn unique characteristics.

FIG. 7 is a table 700 showing an example of the weights of different parameters for a user device. It may be noted that the table 700 shows the uniqueness of certain aspects of the apps and the lack of uniqueness of the aspects of other apps. Therefore, the aspects with greater weights can identify user devices with more specificity.

The systems and methods of the present disclosure may be configured to use the above categorization parameters along with machine learning techniques to learn the specific usage patterns or characteristics of the different user devices operating on a section of a network (e.g., a Wi-Fi network). Also, the systems and methods may be configured to create a behavioral model of each of the users. Each model may be assigned a unique User ID indicating the user of the device. Also, a Device ID may also be assigned to identify the user devices. The Device ID may be distinct from a MAC address associated with the user devices and may be stored separately. However, when it is determined that they are related to the same device, the present disclosure may be configured to stitch these two identifying fields together. In this way, the present disclosure may be configured to create and maintain the MAC address and Device ID and may map the two together along with other stitched connections.

When a device first comes online on the Wi-Fi system with a new MAC address, the behavior of this device may be recorded for a period of time (e.g., 3-5 minutes) that may be sufficient to determine certain usage patterns. This current behavior can be compared against the previously learned models and rules for each of the other user device on the network. If the behavior matches any existing models, the MAC address and the Device ID mappings may be updated. Also, the old and new MAC addresses may be stitched as needed to maintain a consistent identity of a single device (or multiple devices used by the same user). If the behavior does not match any existing model, the device may be tagged as a new device. Learning algorithms may be initiated for this new device.

One benefit of this methodology may be seen in the following example. Whenever the MAC address of a user device is randomized, its behavioral indicators may remain essentially the same. The embodiments of the present disclosure are configured to leverage this fact to quickly identify the user devices and map the randomized MAC address to previously used MAC address (along with the information associated with this other device).

It may be noted that a user may use multiple devices. In this case, these devices might exhibit the same user behavior patterns. With this overlapping behavior, the present disclosure may be configured to use the device type (e.g., iPhone, iPad, etc.) to distinguish the devices from each other and to allow correct mapping.

The systems and methods of the present disclosure may be configured to utilize machine learning techniques for analyzing the usage behavior over time to train one or more behavior models. These models can be retrained using continuous learning to update the models as needed. The machine learning model can then be used in the analysis of identifying the particular user devices based on the usage patterns. The systems described herein may continue to learn (using machine learning techniques) and adapt to any changes in the user's behaviors. For example, a user may delete an app and no longer it or no longer visit a specific domain. In another example, a user (e.g., sixth grader) may exhibit behavior with respect to accessing subject matter that is on a sixth grade level. However, the next year, the user's behavior may change (e.g., access seventh grade level subject matter), which can be detected by the systems and methods of the present disclosure.

One advantage of the present disclosure, for example, is that vendors (who may be owners of specific software and protocol stacks on the devices) can control the protocols and network traffic visibility by encrypting one or more elements of the network traffic. Vendors trying to protect the users' privacy may make it exceedingly complex and difficult for adversaries to identify the MAC addresses. However, as a result, the performance of reputable network analysis systems, which may be based on network protocol characteristics, may deteriorate. Nevertheless, the present disclosure is configured to overcome this encryption strategy by identifying based on user behavior, usage patterns, user practices, user trends, user models, or the like. Thus, the present disclosure utilizes the user's behavioral aspects, which are typically unique and specific to a given user. Vendors will not be able to obscure or hide the user's behavior over the network (e.g., LAN, Wi-Fi network, etc.). The techniques or algorithms of the present disclosure may be self-adapting to allow the systems to continue to learn new behavioral indicators and evolve to stay current with any changes in the user's behaviors.

One key concept of the present disclosure, therefore, may be to use the above listed usage parameters, create a behavioral model around these usage parameters, and leverage this model to uniquely tag a user. The systems and methods described herein may use the user profile to uniquely identify the user devices that he/she owns or uses. As a result, the present disclosure may be configured to identify the device using its owner's behavioral profile.

Figure 8:
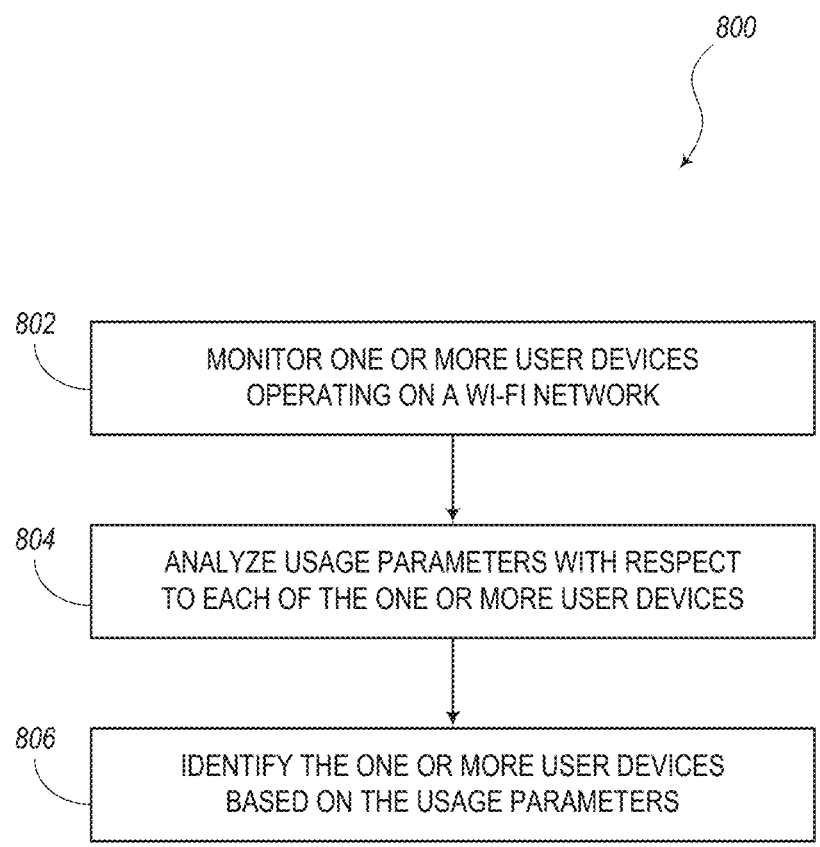
FIG. 8 is a flow diagram showing a process for stitching MAC addresses based on user behavior.

FIG. 8 is a flow diagram illustrating an embodiment of a process 800 for identifying a user device based on usage behavior information. Based on identifying a device, the systems and methods may further be configured to stitch MAC addresses together based on this usage behavior. As illustrated, the process 800 includes the step of monitoring one or more user devices operating on a Wi-Fi network, as indicated in block 802. The process 800 further include the step of analyzing usage parameters with respect to each of the one or more user devices, as indicated in block 804. Also, the process 800 includes identifying the one or more user devices based on the usage parameters, as indicated in block 806.

In some embodiments, the process 800 may further include the steps of a) retrieving a device identifier associated with each of the one or more user devices, and b) correlating the device identifier of each of the one or more user devices with an operational identity based on the usage parameters. For example, the device identifier associated with each of the one or more user devices may be a Media Access Control (MAC) address. The process 800 may also include the steps of a) detecting when a new MAC address is retrieved with respect to an unidentified user device operating on the Wi-Fi network, b) analyzing current usage parameters of the unidentified user device, and c) comparing the current usage parameters of the unidentified user device with the usage parameters of the one or more previously-identified user devices. In response to determining that the current usage parameters match the usage parameters of one of the previously-identified user devices, the process 800 may perform the step of stitching the new MAC address with the MAC address of the corresponding previously-identified user device. Alternatively, in response to determining that the current usage parameters do not match the usage parameters of the one or more previously-identified user devices, the process 800 may perform the step of tagging the unidentified user device as a new device to be monitored on the Wi-Fi network.

The process 800 may also include the step of analyzing, over a period of time, the usage parameters with respect to each of the one or more user devices. Then, based on the usage parameters analyzed over time, the process 80 may include creating one or more behavioral models associated with one or more users, whereby each behavioral model may represent a usage pattern of a respective user according to how the user uses at least one of the devices. In some embodiments, the step of analyzing the usage parameters over time may include utilizing a machine learning technique to create the one or more behavioral models. The process 800 may further include the steps of a) assigning one or more unique user identifiers for representing the one or more users, and b) associating the one or more unique user identifiers with the one or more behavioral models. Also, the process 800 may include the step of retraining the one or more behavioral models based on changes to the usage parameters of each corresponding user.

According to additional embodiments, the usage parameters described herein may be related to an identity of one or more apps installed on the one or more user devices. Also, the usage parameters may be related to app usage information, where the app usage information may include a) a frequency of use of one or more apps, b) a time spent in each of the one or more apps, c) a type of communication associated with app use, d) a time of day of app use, and/or other information. Furthermore, the usage parameters may be related to an identity of one or more websites or domains accessed by the one or more user devices.

In some embodiments, the process 800 may include the step of refining an identity of each of the one or more user devices based on weighted values of multiple metrics. The metrics may include a) an identity of one or more apps installed, b) app usage information, c) browsing patterns, and/or other metrics. The weighted values, for example, may be related to a uniqueness of each of the metrics. The user devices mentioned herein may include smart phones, computers, laptops, tablets, smart televisions, Internet of Things (IoT) devices, media players, or other suitable devices in communication with the Wi-Fi network. In some implementations, the usage parameters may be related to device-based behaviors, such as a) Wi-Fi access point usage, b) Wi-Fi network connection patterns, c) Bluetooth-related transmission, d) device port usage, and/or other behaviors associated with the devices.

Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer readable code stored thereon, the computer readable code configured to enable a computer to perform the steps of:

monitoring one or more user devices operating on a Wi-Fi network;

analyzing usage parameters with respect to each of the one or more user devices, the analysis comprising analyzing, over time, the usage parameters with respect to each of the one or more user devices;

creating, based on the analysis of the usage parameters over time, one or more behavioral models associated with one or more users, each behavioral model representing a usage pattern of a respective user according to how the respective user uses at leastone of the one or more user devices;

assigning one or more unique user identifiers for representing the one or more users;

associating the one or more unique user identifiers with the one or more behavioral models;

identifying the one or more user devices based on the usage parameters; and configuring the Wi-Fi network based on at least a portion of the usage parameters.

2. The non-transitory computer-readable storage medium of claim 1, wherein the computer readable code is further configured to enable the computer to perform the steps of:

retrieving a device identifier associated with each of the one or more user devices; and correlating the device identifier of each of the one or more user devices with an operational identity based on the usage parameters.

3. The non-transitory computer-readable storage medium of claim 2, wherein the device identifier associated with each of the one or more user devices is a Media Access Control (MAC) address.

4. The non-transitory computer-readable storage medium of claim 3, wherein the computer readable code is further configured to enable the computer to perform the steps of:
   detecting when a new MAC address is retrieved with respect to an unidentified user device operating on the Wi-Fi network,
   analyzing current usage parameters of the unidentified user device; and
   comparing the current usage parameters of the unidentified user device with the usage parameters of the one or more previously-identified user devices.

5. The non-transitory computer-readable storage medium of claim 4, wherein, in response to determining that the current usage parameters match the usage parameters of one of the previously-identified user devices, the computer readable code is further configured to enable the computer to perform the step of stitching the new MAC address with the MAC address of the corresponding previously-identified user device.

6. The non-transitory computer-readable storage medium of claim 1, wherein the step of analyzing the usage parameters over time includes utilizing a machine learning technique to create the one or more behavioral models.

7. The non-transitory computer-readable storage medium of claim 1, wherein the computer readable code is further configured to enable the computer to perform the step of retraining the one or more behavioral models to accommodate changes to the usage parameters of each corresponding user.

8. The non-transitory computer-readable storage medium of claim 1, wherein the usage parameters are related to an identity of one or more apps installed on the one or more user devices.

9. The non-transitory computer-readable storage medium of claim 1, wherein the usage parameters are related to the categories of one or more apps installed on the one or more user devices.

10. The non-transitory computer-readable storage medium of claim 1, wherein the usage parameters are related to app usage information, and wherein the app usage information includes one or more of:
    a frequency of use of one or more apps,
    a time spent in each of the one or more apps,
    a type of communication associated with app use, and
    a time of day of app use.

11. The non-transitory computer-readable storage medium of claim 1, wherein the usage parameters are related to an identity of one or more websites or domains accessed by the one or more user devices.

12. The non-transitory computer-readable storage medium of claim 1, wherein the usage parameters are related to categories of websites or domains accessed by the one or more user devices.

13. The non-transitory computer-readable storage medium of claim 1, wherein the usage parameters are related to one or more of open ports, networking services, security level, security policies, or potential security vulnerabilities on the one or more user devices.

14. The non-transitory computer-readable storage medium of claim 1, wherein the computer readable code is further configured to enable the computer to perform the step of refining an identity of each of the one or more user devices based on weighted values of multiple metrics including one or more of:
    an identity of one or more apps installed,
    app usage information, and
    browsing patterns,
    wherein the weighted values are related to a uniqueness of each of the metrics.

15. The non-transitory computer-readable storage medium of claim 1, wherein the computer readable code is further configured to enable the computer to perform the step of refining an identity of each of the one or more user devices based on both the usage parameters of the device, and a determined device type for the device.

16. The non-transitory computer-readable storage medium of claim 1, wherein the one or more user devices include one or more smart phones, computers, laptops, tablets, smart televisions, Internet of Things (IoT) devices, and/or media players, and wherein the usage parameters are related to device-based behaviors, the device-based behaviors including one or more of Wi-Fi access point usage, Wi-Fi network connection patterns, Bluetooth-related transmission, and device port usage.

17. A system comprising:
    a processor; and
    memory configured to store computer logic having instructions that enable the processor to:
       monitor one or more user devices operating on a Wi-Fi network;
       analyze usage parameters with respect to each of the one or more user devices, the analysis comprising analyzing, over time, the usage parameters with respect to each of the one or more user devices;
       create, based on the analysis of the usage parameters over time, one or more behavioral models associated with one or more users, each behavioral model representing a usage pattern of a respective user according to how the respective user uses at least one of the one or more user devices;
       assign one or more unique user identifiers for representing the one or more users;
       associate the one or more unique user identifiers with the one or more behavioral models;
       identify the one or more user devices based on the usage parameters; and
       configure the Wi-Fi network based on at least a portion of the usage parameters.

18. A method comprising the steps of:
    monitoring one or more user devices operating on a Wi-Fi network;
    analyzing usage parameters with respect to each of the one or more user devices, the analysis comprising analyzing, over time, the usage parameters with respect to each of the one or more user devices;
    creating, based on the analysis of the usage parameters over time, one or more behavioral models associated with one or more users, each behavioral model representing a usage pattern of a respective user according to how the respective user uses at least one of the one or more user devices;
    assigning one or more unique user identifiers for representing the one or more users;
    associating the one or more unique user identifiers with the one or more behavioral models;
    identifying the one or more user devices based on the usage parameters; and configuring the Wi-Fi network based on at least a portion of the usage parameters.

\* \* \* \* \*